US008830060B2

(12) United States Patent
Pikkarainen et al.

(10) Patent No.: US 8,830,060 B2
(45) Date of Patent: Sep. 9, 2014

(54) THEFT PREVENTION SYSTEM AND METHOD

(75) Inventors: Mark Pikkarainen, New Brighton, MN (US); Bradford Beale, New Brighton, MN (US)

(73) Assignee: Comtrol Corporation, New Brighton, MN (US)

( * ) Notice: Subject to any disclaimer, the term of this patent is extended or adjusted under 35 U.S.C. 154(b) by 327 days.

(21) Appl. No.: 13/210,937

(22) Filed: Aug. 16, 2011

(65) Prior Publication Data

US 2012/0038456 A1 Feb. 16, 2012

Related U.S. Application Data

(60) Provisional application No. 61/374,076, filed on Aug. 16, 2010, provisional application No. 61/495,253, filed on Jun. 9, 2011.

(51) Int. Cl.

| | |
|---|---|
| ***G08B 13/18*** | (2006.01) |
| ***G08B 13/00*** | (2006.01) |
| ***G08B 13/08*** | (2006.01) |
| ***G05B 19/00*** | (2006.01) |
| ***G08B 26/00*** | (2006.01) |
| ***G08B 13/14*** | (2006.01) |
| ***G01C 3/08*** | (2006.01) |
| ***G08B 13/24*** | (2006.01) |
| ***G08B 13/181*** | (2006.01) |
| ***G08B 13/183*** | (2006.01) |

(52) U.S. Cl.

CPC ............ *G08B 13/181* (2013.01); *G08B 13/248* (2013.01); *G08B 13/2494* (2013.01); *G08B 13/183* (2013.01); *G08B 13/2454* (2013.01)

USPC ....... 340/567; 340/541; 340/545.3; 340/5.61; 340/505; 340/572.1; 356/5.01

(58) Field of Classification Search

USPC ........................................................ 340/5.61

See application file for complete search history.

(56) References Cited

U.S. PATENT DOCUMENTS

| | | | | |
|---|---|---|---|---|
| 5,886,634 | A * | 3/1999 | Muhme | 340/572.1 |
| 6,300,872 | B1 * | 10/2001 | Mathias et al. | 340/540 |
| 7,126,477 | B2 * | 10/2006 | Gallivan et al. | 340/567 |

(Continued)

FOREIGN PATENT DOCUMENTS

| | | | |
|---|---|---|---|
| GB | 2316169 | A | 2/1998 |
| WO | 2004068432 | A1 | 8/2004 |
| WO | 2008020893 | A1 | 2/2008 |
| WO | 2008059216 | A1 | 5/2008 |

OTHER PUBLICATIONS

PCT Search Report mailed Nov. 10, 2011, 10 pages.
U.S. Appl. No. 61/382,122, filed Sep. 13, 2010, 28 pgs.

*Primary Examiner* — Jennifer Mehmood
*Assistant Examiner* — John Mortell
(74) *Attorney, Agent, or Firm* — Dicke, Billig & Czaja, PLLC

(57) ABSTRACT

A theft prevention system includes an RFID reader configured to read an RFID tag to authenticate access to a predefined area, a laser scanner configured to scan the predefined area and detect an object in the predefined area, and a security component configured to initiate a security action when the detected object is at least one of an unauthenticated object and an unauthorized object.

18 Claims, 18 Drawing Sheets

(56) References Cited

U.S. PATENT DOCUMENTS

| | | | | |
|---|---|---|---|---|
| 7,319,395 | B2 * | 1/2008 | Puzio et al. | 340/572.1 |
| 7,388,481 | B1 * | 6/2008 | Cahn | 340/505 |
| 7,760,336 | B2 * | 7/2010 | Iwasawa | 356/5.01 |
| 7,940,178 | B2 * | 5/2011 | Iwasawa | 340/557 |
| 8,035,515 | B2 * | 10/2011 | Jang et al. | 340/557 |
| 8,354,928 | B2 * | 1/2013 | Morcom | 340/555 |
| 2002/0118111 | A1 * | 8/2002 | Brown et al. | 340/573.1 |
| 2009/0091446 | A1 | 4/2009 | Jang et al. | |
| 2011/0273293 | A1 | 11/2011 | Itkin et al. | |
| 2012/0062380 | A1 * | 3/2012 | Bird et al. | 340/539.31 |

* cited by examiner

FIG. 8
Secure Zone (24)
RFID Read Zone (32)

THEFT PREVENTION SYSTEM AND METHOD

CROSS-REFERENCE TO RELATED APPLICATIONS

This application claims priority under 35 U.S.C. §119(e) to U.S. Provisional Patent Application Ser. No. 61/374,076, filed on Aug. 16, 2010, and incorporated herein by reference.

This application claims priority under 35 U.S.C. §119(e) to U.S. Provisional Patent Application Ser. No. 61/495,253 filed on Jun. 9, 2011, and incorporated herein by reference.

FIELD OF THE INVENTION

The present invention relates generally to theft prevention and, more specifically, to a theft prevention/deterrent system and method for the protection of merchandise, items or goods.

BACKGROUND OF THE INVENTION

Today, item level tagging is often used in retail store settings to prevent thieves from stealing merchandise. An audible alarm, for example, is triggered when the stolen item passes through a tag reader at the doorway of the store. At this point, however, the merchandise is in the thief's possession and, in most cases, the alarm will prompt the subject to run. This system, together with security cameras, has been used at most retail stores for years and has been ineffective at preventing theft or assisting in the recovery of stolen goods.

According to the latest research studies, the retail industry loses over 36 billion dollars per year to theft, with 65 percent being unnoticed at the time of the occurrence. The solution proposed herein is designed to prevent or deter theft before the perpetrator is able to take hold of the goods. In addition, by creating an alert to store personnel while the thief is still inside the store, there is a greater likelihood of success to prevent or deter the theft from occurring.

DETAILED DESCRIPTION

The concept being presented is a theft prevention/deterrent system and method used for the protection of merchandise, items or goods, such as high value merchandise, items or goods, that are placed behind a counter area or within another defined or contained area of a retail store or other setting. The system and method includes a tagging/monitoring system using a time-of-flight (TOF) laser sensor (Lidar), and radio frequency identification (RFID) proximity sensor tags to automatically trigger the system and sound an alarm upon breach of an invisible light shield created by the time-of-flight (TOF) laser. With the system and method described herein, retail establishments could improve loss prevention and/or decrease the amount of merchandise stolen.

Figure 1:
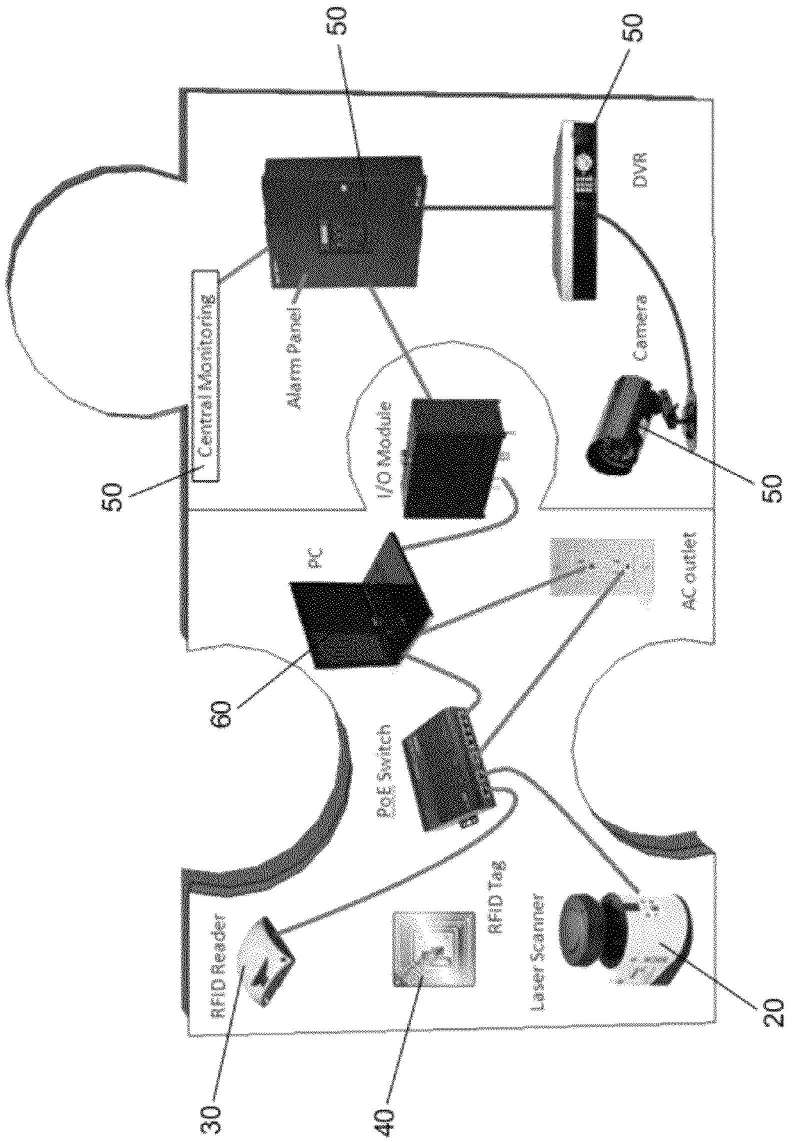
FIG. 1 schematically illustrates an embodiment of a theft prevention/deterrent system and method.

In one embodiment, as schematically illustrated, for example, in FIG. 1, the system and method incorporates the following components: one or more TOF laser sensors/scanners 20, one or more RFID (radio frequency identification) readers 30, one or more RFID (radio frequency identification) tags 40, one or more security elements or components 50, including one or more alarms (buzzer, horn, siren, flashing light, etc.) and/or one or more security cameras and video recorders, one or more servers or computing devices 60 with which the other components (sensors/scanners, readers, alarms, cameras, recorders, etc.) are operatively and/or communicatively coupled so as to operate as a tagging/monitoring system, and software embodied on a computer readable medium and including computer-executable instructions executed and/or operating on a processor of the server(s) or computing device(s) for controlling the system and method.

In the example of FIG. 1, the computing device 60 (e.g., PC) will have software that allows the RFID reader 30 to communicate with the laser scanner 20. In one embodiment, the alarm signal will come from the PC and be tied into the alarm panel via an I/O module. In addition, standard AC power will provide power to a PoE (Power over Ethernet) switch and the PC, and the PoE switch will provide power/communication to the laser scanner 20 and the RFID reader 30. As described below, the RFID tags 40 can be worn on employee lanyards and/or incorporated into employee name tags.

Instead of putting RFID tags on each item that is placed, for example, behind the retail counter (cigarettes, digital cameras, mobile phones, prescription drugs, jewelry, guns, etc.), the RFID tag 40 is attached to or incorporated into an employee badge or access card worn or carried by an employee or other personnel who works behind the retail counter and/or is authorized to access a specific or predefined area.

In one embodiment, the RFID reader 30 operates as a verification or authentication sensor to create a verification or authentication field for controlled access to the specific or predefined area. As such, the RFID reader 30 operates with a read zone 32 to read an RFID tag 40 which passes through or is positioned within the read zone 32. In one embodiment, the RFID reader 30 is positioned at an access point to a defined zone or area to be controlled, protected and/or secured (i.e., the specific or predefined area), such as an entry and/or exit point (or points) to an area behind a counter, or other area where merchandise, items or goods are displayed or stored (e.g., warehouse). In one embodiment, the RFID reader 30 operates as a proximity sensor to read an RFID tag 40 within a defined or established range of the zone or area to be controlled, protected and/or secured (e.g., secure zone).

In one embodiment, each tagged employee badge or access card (i.e., RFID tag) contains the employee's identification as well as other pertinent information. In one embodiment, the employee's RFID badge or access card is read each time they enter (or exit) the area behind the counter or other defined controlled, protected or secure zone or area. In one embodiment, the RFID reader 30 sends this tracking information to a back-end system (i.e., control and/or monitoring system) allowing for recording of arrival time/departure time, including entry into and/or exit from the specific area, name, etc.

In one embodiment, the laser sensor/scanner 20 comprises a time-of-flight (TOF) laser sensor/scanner (Lidar) and operates as a boundary detection sensor to establish or define a controlled, protected or secure zone or area. The laser sensor/scanner 20 is mounted, for example, to sense or scan an area where an employee conducts business, and/or an area where protected merchandise is stored or kept. The laser sensor/scanner 20 operates with a scan zone 22, such that one or more zones may be defined as a subset of the scan zone 22 to establish an alarm or secure zone 24 within the scan zone 22. The alarm or secure zone 24 may also coincide with the scan zone 22.

In one embodiment, the laser sensor/scanner 20 is mounted above the counter or at counter level, and creates an invisible light shield (e.g., class-1 infra-red eye safe). The invisible light shield may include a vertical light shield (i.e., curtain) and/or a horizontal light shield (i.e., apron) established within and/or around the counter and/or other defined area. The laser sensor/scanner 20 is operatively and/or communicatively coupled to the back-end system (i.e., control and/or monitoring system), and communicates with the RFID reader 30 to arm, disarm, or otherwise control access to the defined area (e.g., secure zone 24).

In one embodiment, whenever an authorized employee leaves the counter area or a defined proximity of a specific or defined area, or the area is left unattended, the laser sensor/scanner 20 automatically sets up an invisible light shield (e.g., class-1 infra-red eye safe), essentially "closing off" the area behind the counter or other defined area to anyone without the proper RFID tagged employee badge or access card.

In one embodiment, the laser sensor/scanner 20 is automatically disarmed when an employee with the proper RFID badge returns to the counter area or is positioned within a defined proximity of the RFID reader 30. The laser sensor/scanner 20 can also be operated to turn on automatically after store hours so as to provide additional security after store hours, such as throughout the night time hours.

In one embodiment, the laser sensor/scanner 20 remains active while an authorized employee or personnel is within the protected space (e.g., secure zone 24). For example, upon re-entry (or entry) into the protected area by the authorized employee, the system remains active to provide asset protection while allowing the authorized employee to move freely within the area. Thus, if the authorized employee is occupied, for example, with a customer or other task, the system provides protection over the areas out of the employee's sight or unattended by the employee.

When the system is armed, breach of the light shield initiates one or more security actions by the one or more security elements or components 50. The breach may be caused by an unauthorized person or object. Some examples of a security breach include: an individual reaching over the counter to take hold of items within a display case; an individual jumping over the counter to take goods; or an individual walking around the counter to enter and take merchandise. Breach may also include entry by an employee to an area unauthorized for the employee (e.g., the employee may not be authorized for access behind the jewelry counter).

In one embodiment, breach of the light shield triggers an enunciator or audible alarm. The alarm may cause the unsuspecting thief to hesitate and/or cease their actions before any merchandise is removed. The alarm may also draw the attention of people in the vicinity. In one embodiment, breach of the light shield initiates event-driven camera recording and communication, including control of the camera (pan, tilt, zoom) to zoom in and/or track the individual in question. In one embodiment, breach of the light shield signals a central monitoring system.

In one embodiment, the RFID reader 30 in association with the laser sensor/scanner 20 identifies how many individuals should be in the protected spaced or area. For example, with one authorized individual passing through the verification field, the laser sensor/scanner 20 should identify one individual within the protected space. If, however, the authorized individual is no longer detected within the protected space, and has not passed through the verification field, the system initiates a security action. For example, if during an armed robbery, the authorized individual drops or is told to drop to the floor, the authorized individual may no longer be detected within the protected space (e.g., by a horizontal light shield). Since the authorized individual is no longer detected within the protected space, and has not passed through the verification field, the system initiates a security action. Even if an unauthorized individual enters the protected space and is identified as the one individual within the protected space, the system still initiates the security action since the authorized individual (who is out of detection within the protected space) has not passed through the verification field.

Figure 2:
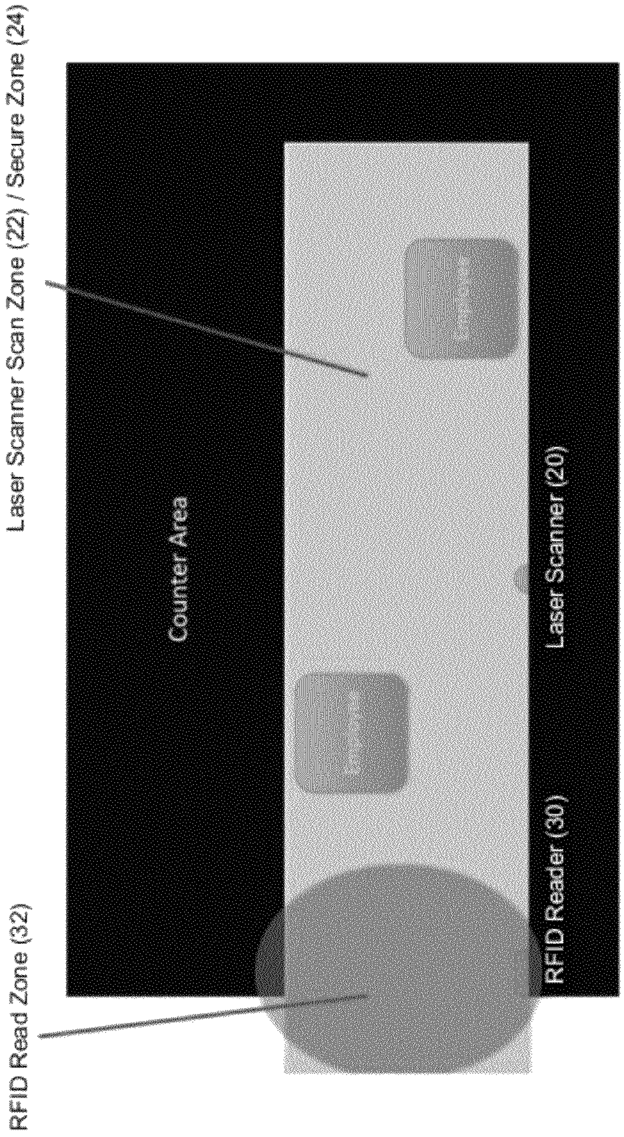
FIG. 2 schematically illustrates an embodiment of a scanner/RFID visualization layout of a theft prevention/deterrent system and method.

FIG. 2 schematically illustrates one embodiment of a basic scanner/RFID visualization layout including a laser scanner 20 having a scan zone 22 and a secure zone 24 within and coinciding with the scan zone 22 behind a counter area, and an RFID reader 30 having a read zone 32 provided at an access point to the scan zone/secure zone (i.e. an area behind the counter). With an authorized individual (e.g., employee) behind the counter area, the laser scanner 20 scans the secure zone 24 to detect any unauthorized objects. In one embodiment, the laser scanner (LMS) works on a line-of-sight such that should an authorized employee stand directly in front of the scanner for a period of time (so as to cover the field of view of the scanner), a warning light could be installed to alert the employee that the field of view is blocked, or a second scanner could be mounted opposite to alleviate this situation (i.e., blocking of the field of view of the scanner).

Figure 3:
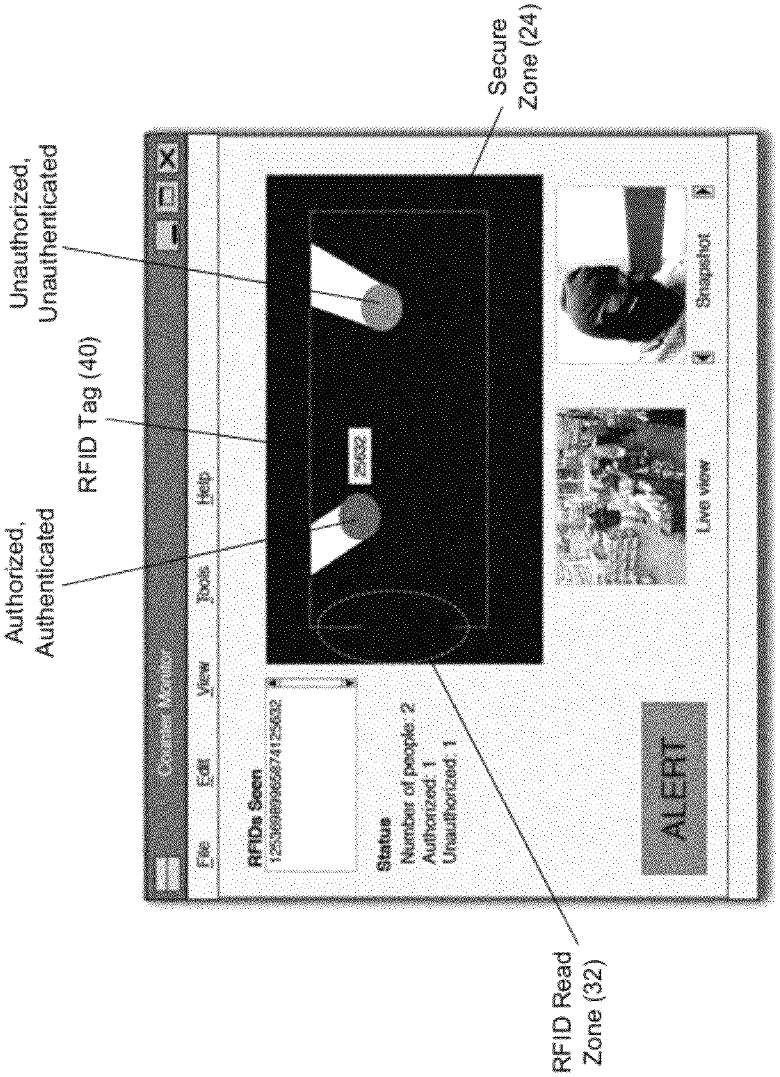
FIG. 3 illustrates an embodiment of a monitor/interface for a theft prevention/deterrent system and method.

FIG. 3 illustrates one embodiment of a software monitor/interface for the theft prevention/deterrent system and method. The software monitor/interface, for example, identifies the RFID tags 40 which have passed through the RFID read zone 32 and have been authenticated for access to the secure zone 24, and provides a status of "Authorized" and "Unauthorized" individuals within the secure zone 24.

As illustrated in the example software monitor/interface of FIG. 3, one RFID tag 40 (i.e., RFID no. '25632) has passed through the read zone 32 and has been authenticated for access to the secure zone 24. Thus, one "Authorized" individual is identified within the secure zone 24. However, one "Unauthorized" individual is also identified within the secure zone 24. As such, a security "Alert" is initiated. In one example, the software monitor/interface provides a "Live view" of the monitored area and a "Snapshot" of the "Unauthorized" individual as captured, for example, from a security camera.

In one embodiment, once an alert is generated, an alarm signal is created which is sent from the computing device 60 (e.g., PC) through an I/O module to an alarm panel. The computing device 60 (e.g., PC) may be located onsite, and/or may include software running offsite. In one embodiment, a central monitoring system receives the alarm signal through the alarm panel. In one embodiment, the central monitoring system can access video through the system and verify the incident. In one embodiment, the central monitoring system has the ability to provide the monitoring company with the exact X and Y coordinates of where the alarm signal comes from. In addition, the central monitoring system has the ability to provide a "Live" view and/or a "Snapshot" view by integrating with an IP (Internet protocol) camera.

Figure 4:
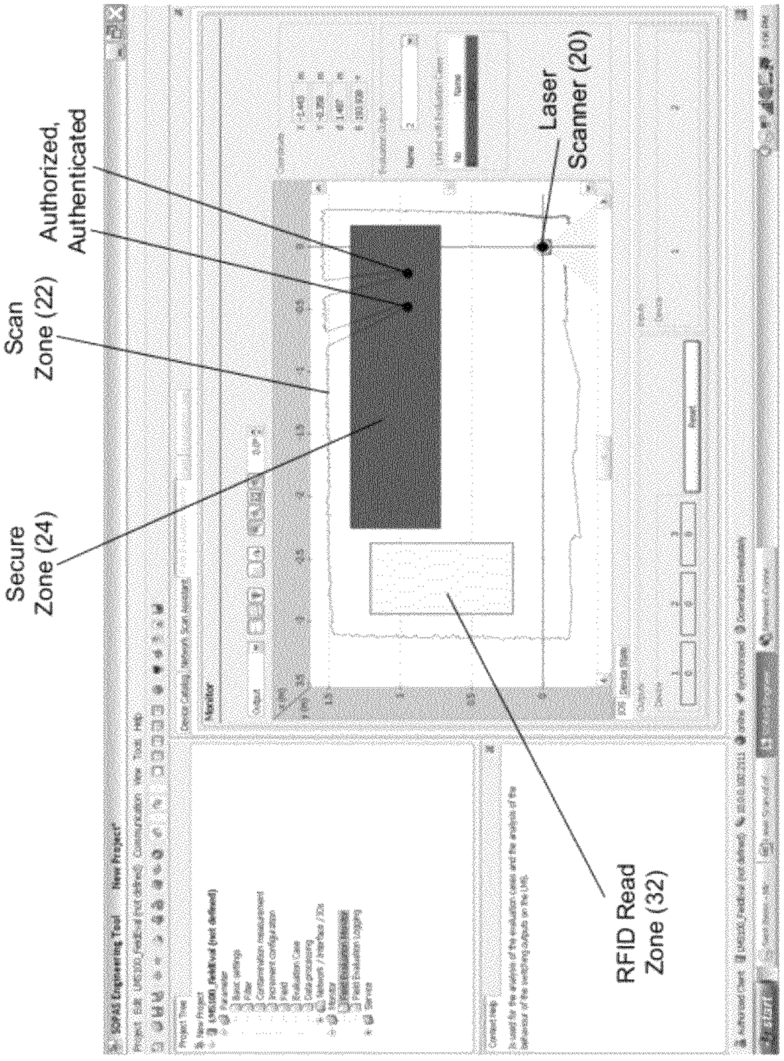
FIGS. 4 and 5 illustrate another embodiment of a monitor/interface for a theft prevention/deterrent system and method.
Figure 5:
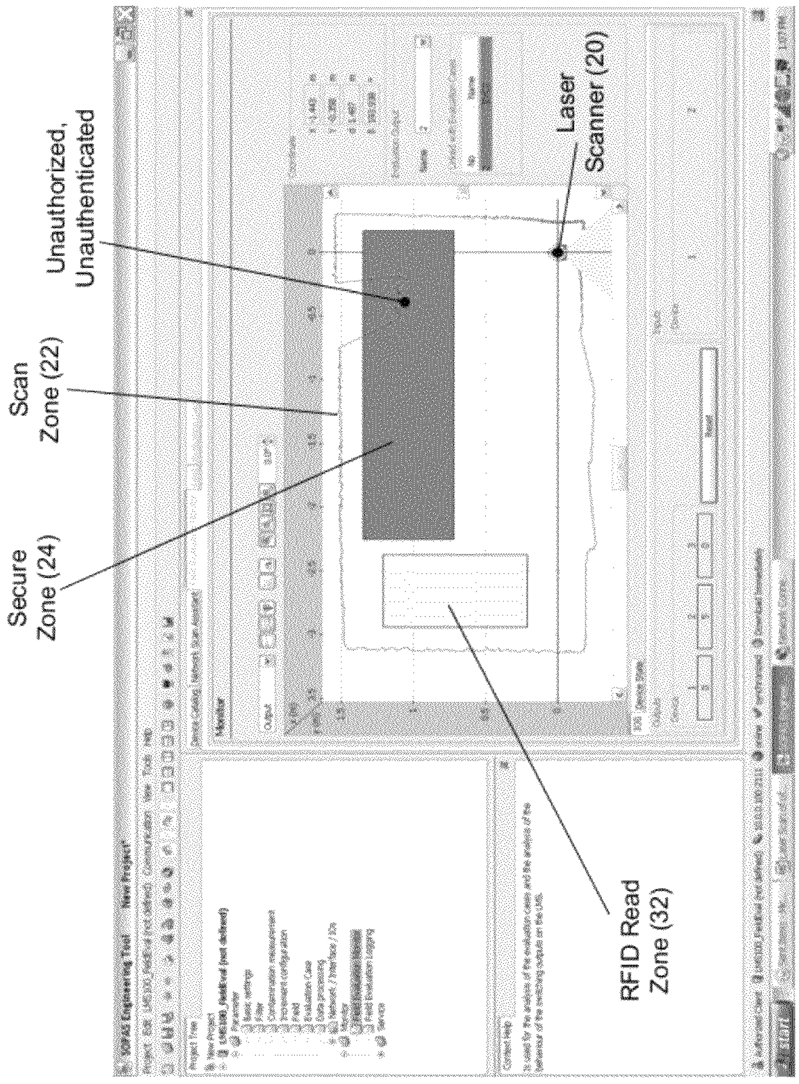

FIGS. 4 and 5 illustrate another embodiment of a monitor/interface for the theft prevention/deterrent system and method. For example, FIGS. 4 and 5 provide actual screen shots from a laser scanner 20 of a defined alarm zone. In the example of FIG. 4, two employees are behind the counter (i.e., within the secure zone 24), and are authorized to be there based on passing through the RFID read zone 32 of the RFID reader.

In the example of FIG. 5, both employees have left the area behind the counter (i.e., the secure zone 24), such that the laser scanner 20 initiates an alarm due to the field of the laser scanner 20 being broken by un-tagged object. Various alarm parameters or filters can be defined for the laser scanner 20 including a size of object filter (nothing of a certain size or smaller will alarm), and/or a duration of object in space filter (alarm will not sound if an object is in the space for less than defined time). For example, if an object is dropped through the beam, or if an employee bends down to grab something and momentarily leaves the beam, such scenarios can be filtered out using software of the system.

As outlined above, and in the tables below, the disclosed system(s) and method(s) include one or more components providing boundary detection, one or more components providing authentication and/or verification, and one or more components providing processing/control.

Boundary Detection:

The purpose of the boundary detection is to identify the location of an object (moving or stationary) within a designated area (e.g., secure zone). The designated area is a subset of the boundary detection sensing area (e.g., scan zone). During operation, the boundary detection is always powered.

| Technology (e.g.,) | Location and Orientation (e.g.,) | Application Situation (e.g.,) |
|---|---|---|
| Laser scanner/sensor | In ceiling - flat, vertical down | Theft |
| Light curtain | On counter - flat, horizontal | Robbery |
| Microwave | Overhead - line of sight | Restricted Area Access |
| Camera | | |
| Ultrasonic | | |

Authentication:

The purpose of the authentication is to allow access to the designated area and/or verify the credentials of an object (moving or stationary) within the designated area. During operation, the authentication sensor is always powered.

| Technology (e.g.,) | Orientation and Location (e.g.,) | Application Situation (e.g.,) |
|---|---|---|
| Radio Frequency Identification | Application specific | Theft |
| Proximity | | Robbery |
| Camera | | Restricted Area Access |
| Iris | | |
| Bluetooth | | |
| Wi-Fi | | |

Processing/Control:

The purpose of the processing/control is to combine the data from the boundary detection and the authentication. Each object within the designated area (i.e., boundary detection zone), as identified by the boundary detection, is tagged as either authorized or unknown by the authentication. For example, with one boundary detection object detected, and only one authentication tagged (or identified) within the designated area, additional objects within the designated area are classified as unknown or unauthorized. Thus, when both set of data are evaluated (detected, unknown/unauthorized), a decision is made to send a signal by a program output or an electrical signal output to initiate a security action (e.g., alarm, camera, central monitoring), as unknown or unauthorized objects are not permitted in the authorized zone. During operation, the processing/control is always powered.

| Technology (e.g.,) |
|---|
| Software embedded in Client/Server computer |
| Software embedded in Boundary Detection or Authentication |

| Decision Table | | Authentication: Not Detected (Un-authenticated) | Authentication: Detected and Authorized | Authentication: Detected and Unauthorized |
|---|---|---|---|---|
| Boundary Detection | Not Detected | No Action | No Action | No Action |
| | Detected outside of Authorized Zone | No Action | No Action | No Action |
| | Detected inside of Authorized Zone | Security Action | No Action | Security Action |

Figure 6:
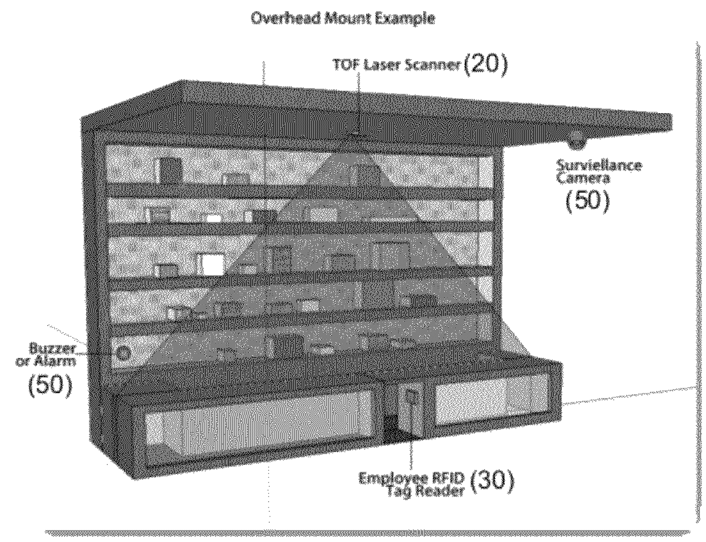
FIGS. 6 and 7 schematically illustrate example embodiments of application of a theft prevention/deterrent system and method.
Figure 7:
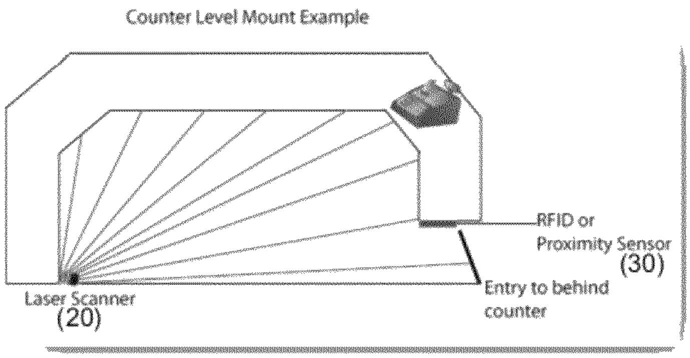
Figure 8:
FIGS. 8-11 schematically illustrate example embodiments of application of a theft prevention/deterrent system and method.
Figure 9:
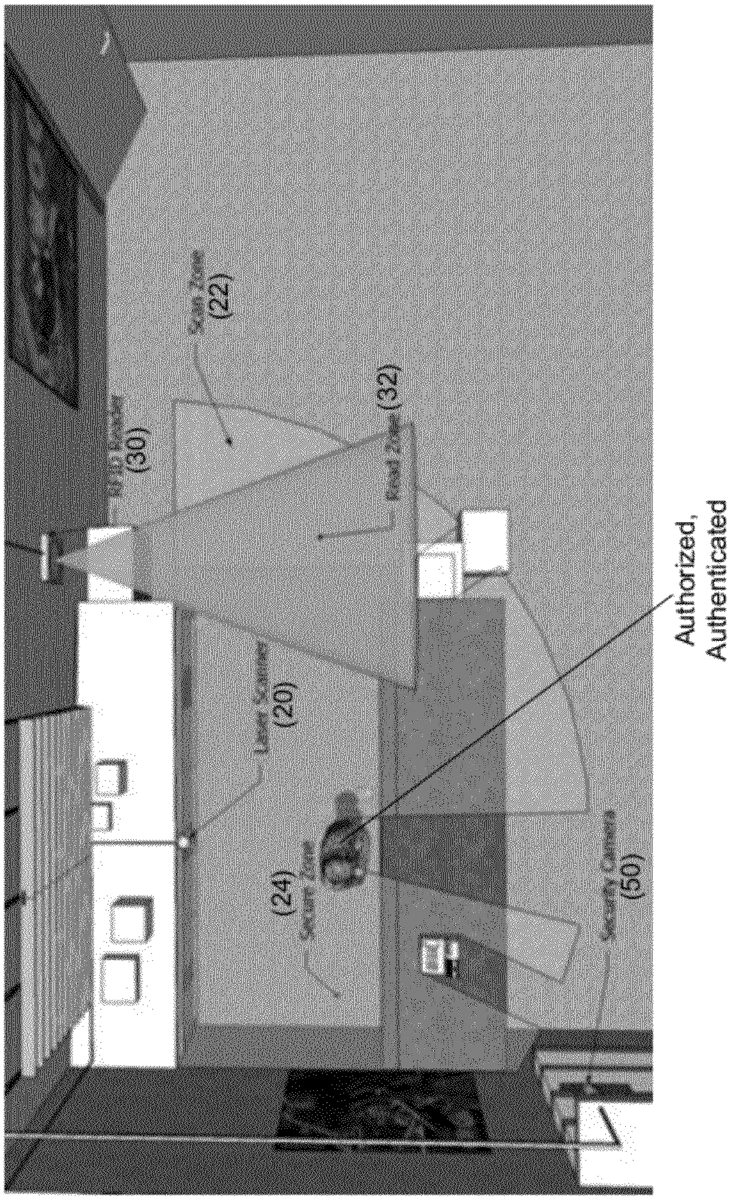
Figure 10:
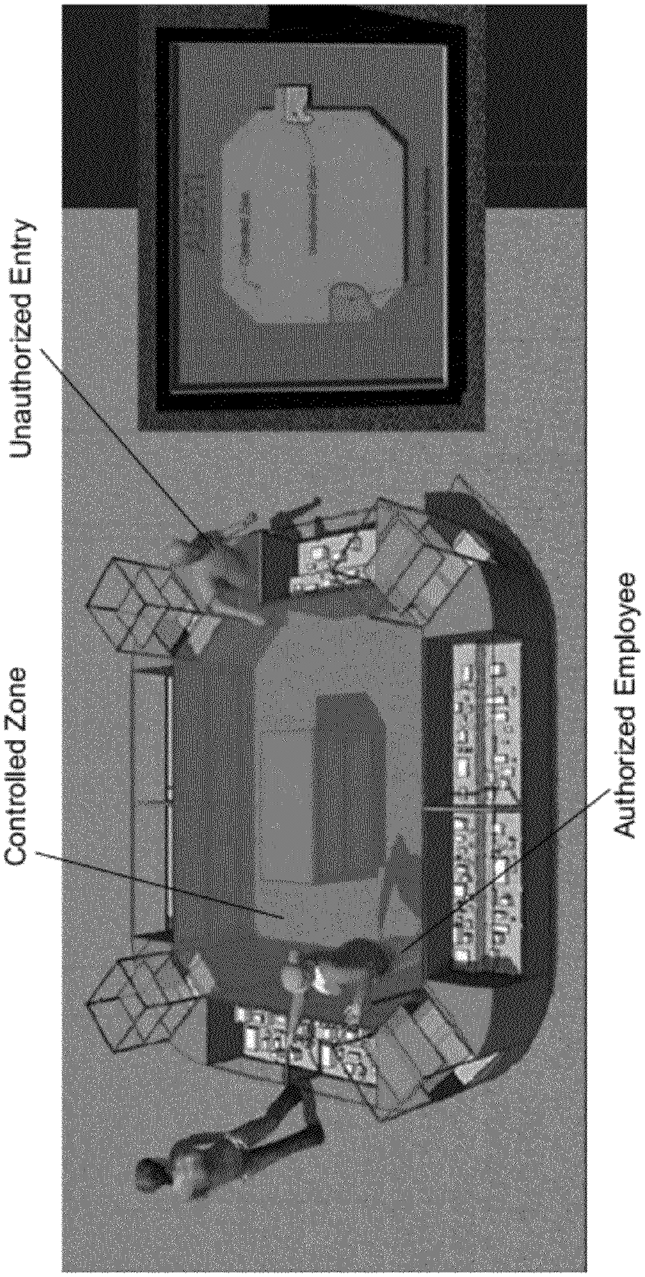
Figure 11:
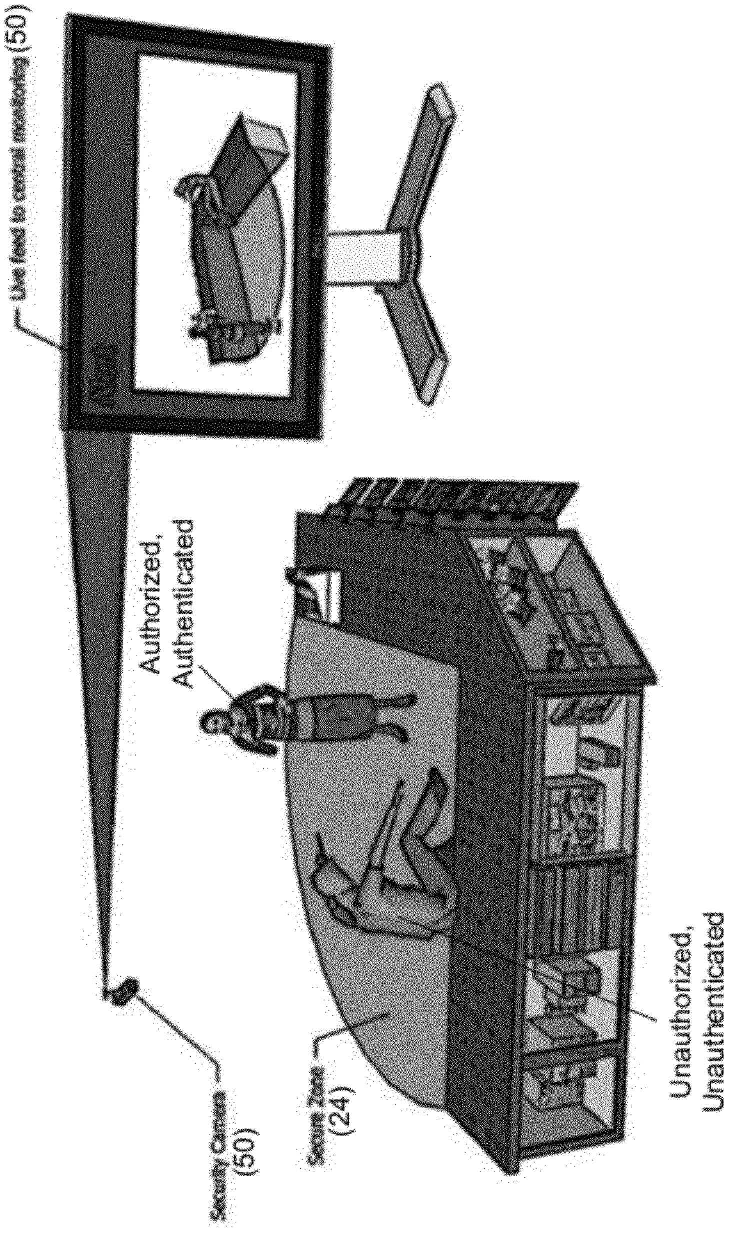

FIGS. 6 and 7 schematically illustrate example embodiments of application of the theft prevention/deterrent system and method, with FIG. 6 schematically illustrating an overhead mount example of the theft prevention/deterrent system and method, and FIG. 7 schematically illustrating a counter-level mount example of the theft prevention/deterrent system and method. In the example of FIG. 6, the laser scanner 20 is mounted above the counter and provides a vertical light shield (i.e., curtain) for securing/protecting merchandise behind the counter. In the example of FIG. 7, the laser scanner 20 is mounted at counter level and provides a horizontal light shield (i.e., apron) within the area behind the counter and/or around the counter or other defined area.

FIGS. 8-11 schematically illustrate example embodiments of application of the theft prevention/deterrent system and method.

Figure 12:
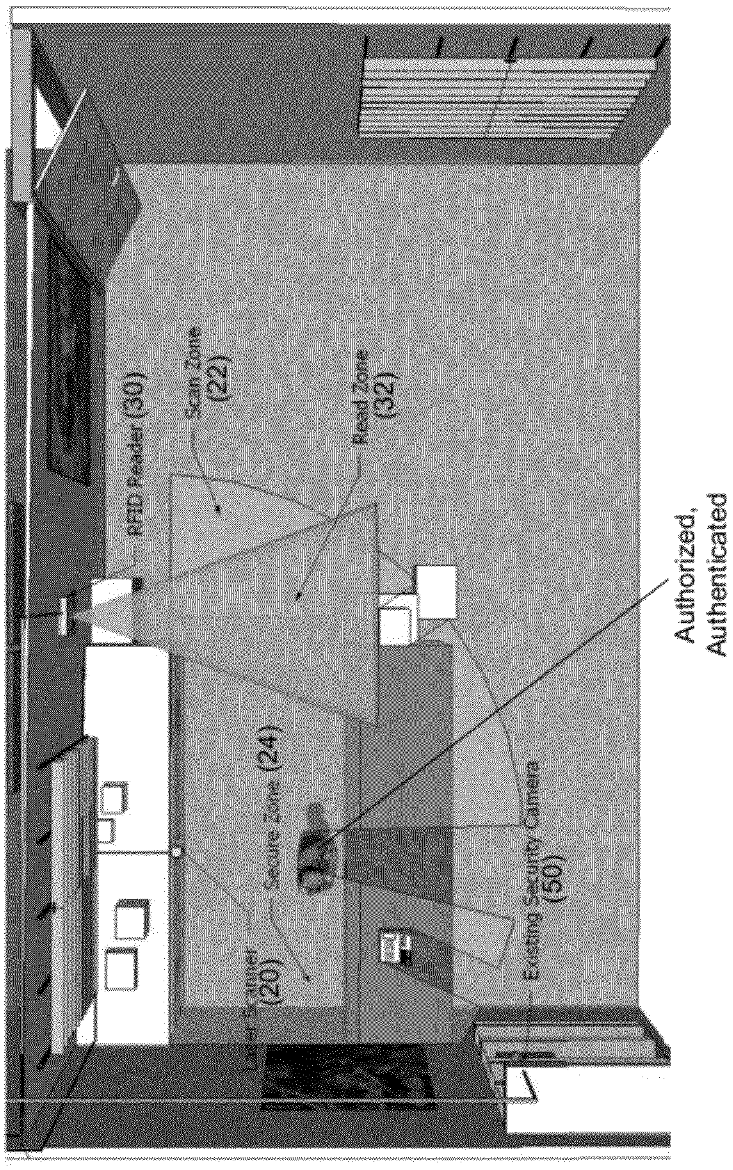
FIGS. 12-17 schematically illustrate an example embodiment of application of a theft prevention/deterrent system and method.

FIGS. 12-17 schematically illustrate an example embodiment of application of the theft prevention/deterrent system and method, with FIG. 12 providing an overhead view schematically demonstrating a general layout of application of the theft prevention/deterrent system and method. It is understood that both the laser scanner 20 and the RFID reader 30 being used for the demonstration have longer range capabilities than those depicted in the animation.

Figure 13:
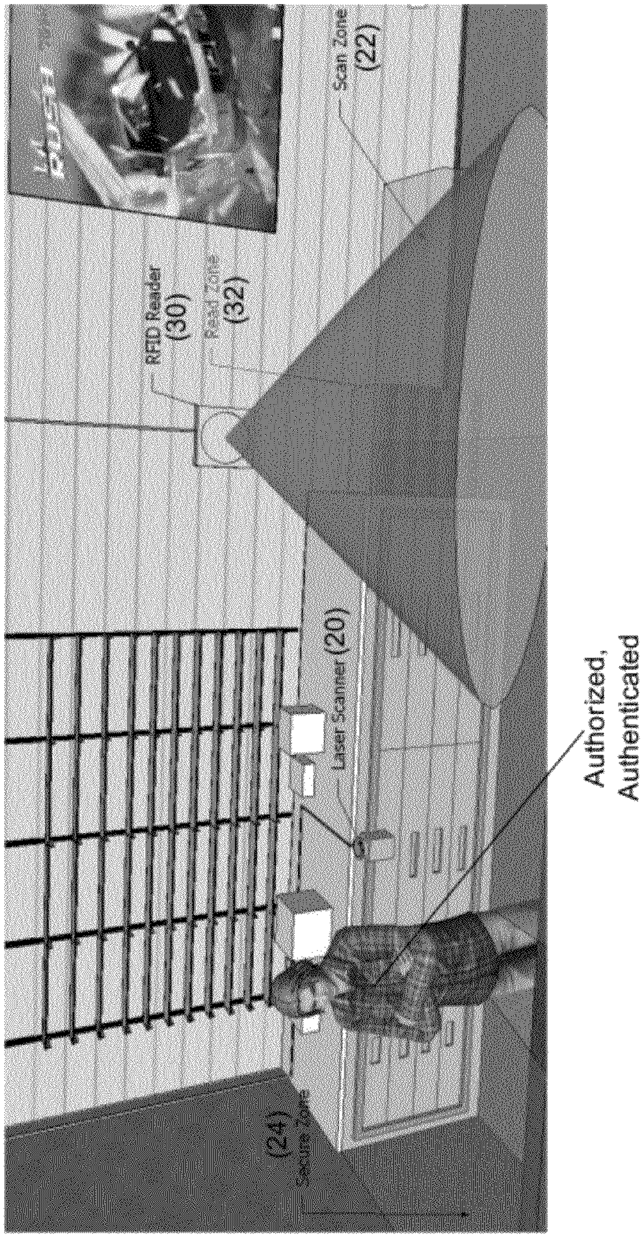
Figure 14:
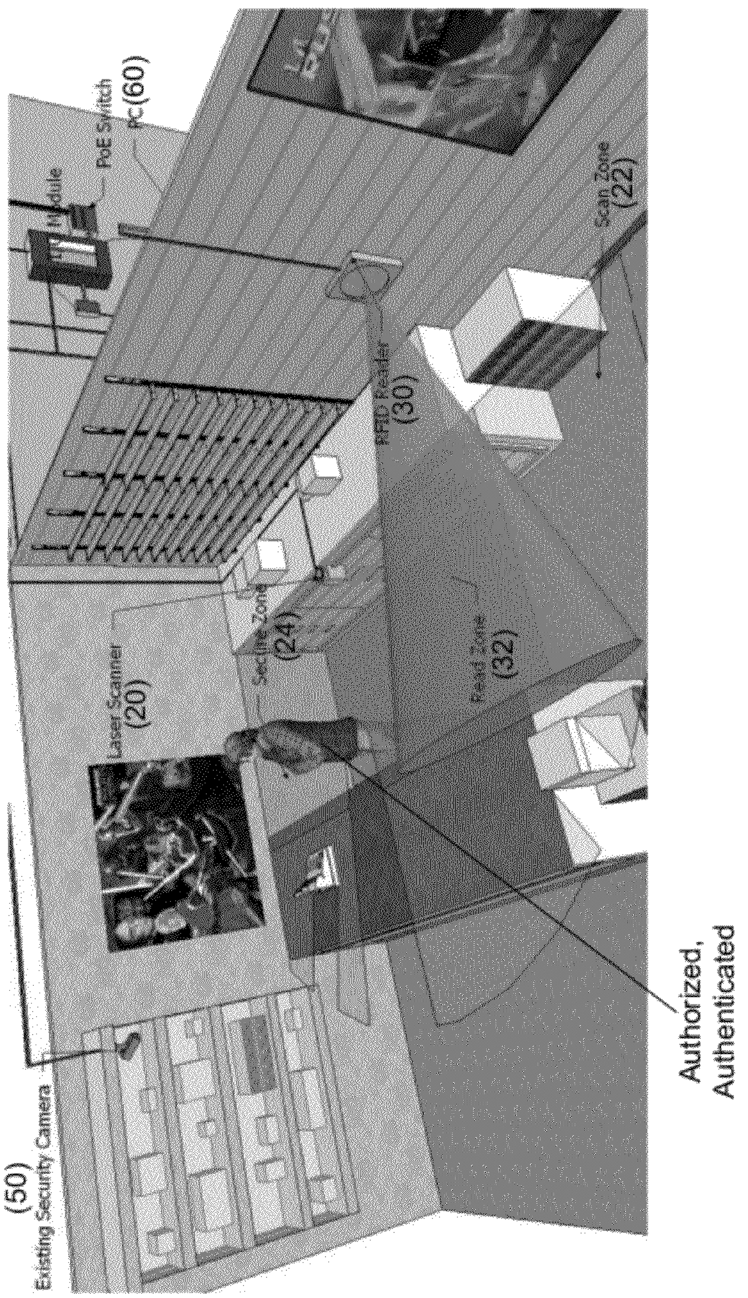
Figure 15:
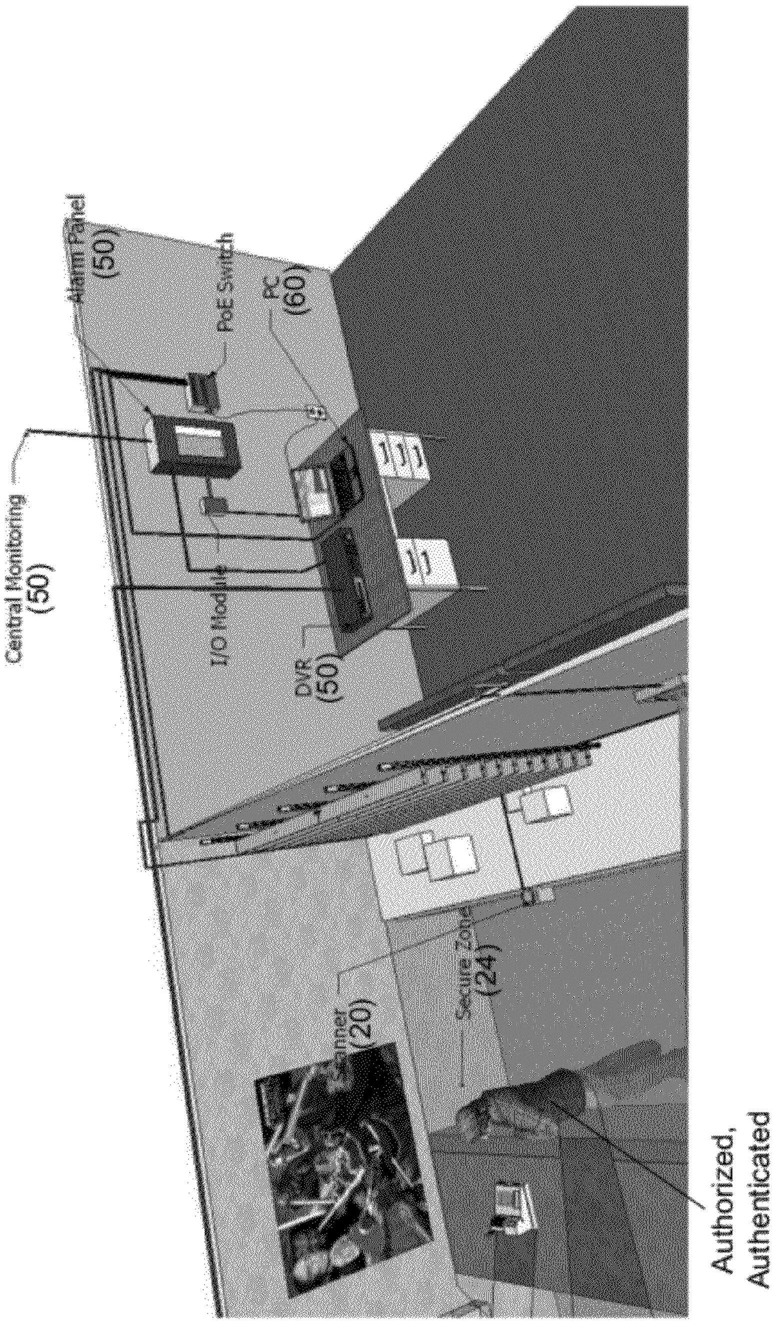

As schematically illustrated in FIG. 13, the secure zone 24 is established behind the counter area. The laser scanner 20 is mounted, for example, at waist height on the back counter, and the RFID reader 30 is mounted, for example, at approximately chest height. FIG. 14 schematically illustrates a different angle of the general layout of application of the theft prevention/deterrent system and method. As schematically illustrated in FIG. 15, components of the theft prevention/deterrent system and method (e.g., laser scanner, RFID reader, security camera) are operatively and/or communicatively coupled so as to operate as a monitoring system. Wiring for the components can be run, for example, up through the ceiling from one room to another room where the alarm panel and other system components reside.

Figure 16:
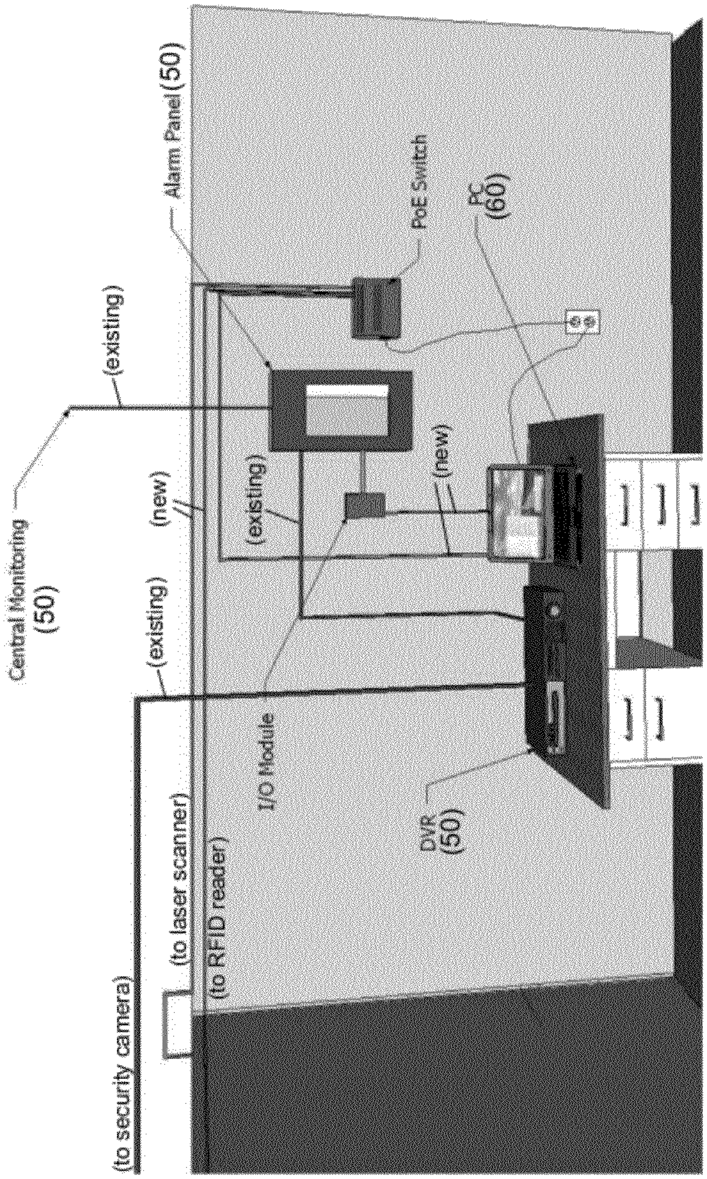
Figure 17:
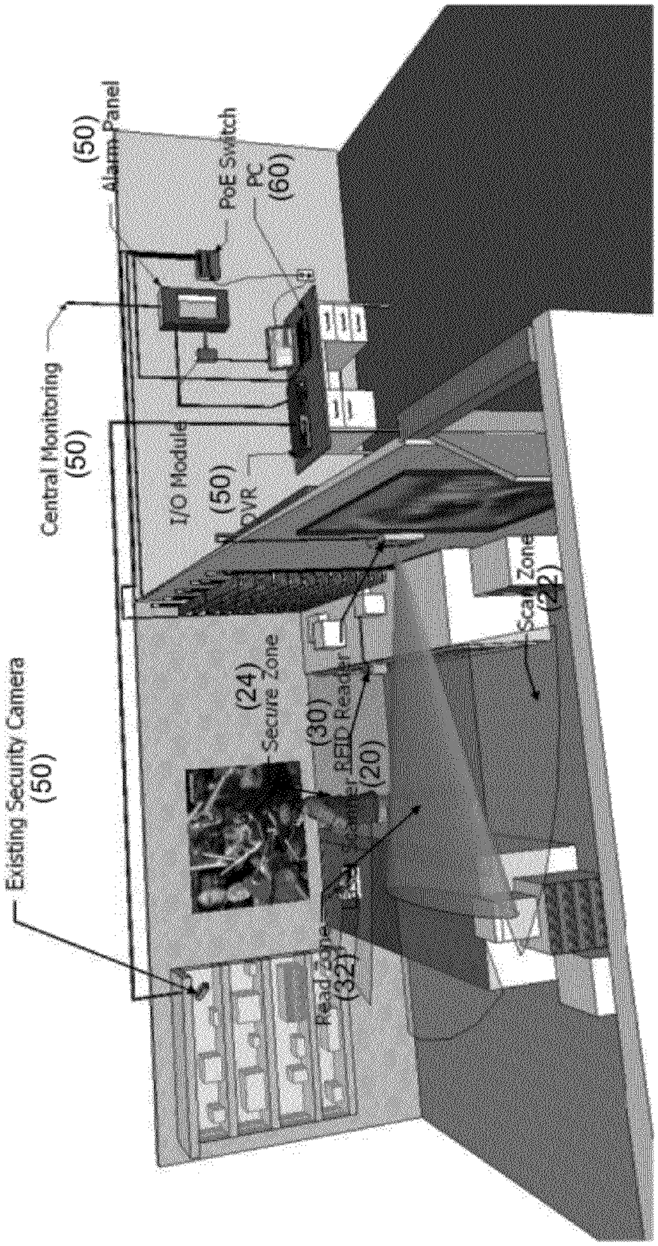

FIG. 16 schematically illustrates operative and/or communicative coupling or connection of the components of the theft prevention/deterrent system and method, including incorporating the theft prevention/deterrent system and method into an existing monitoring system. Components of the theft prevention/deterrent system and method (e.g., laser scanner, RFID reader) may be connected over an Ethernet network (e.g., CAT5) and connected to a PoE (Power-over-Ethernet) switch which is connected to the computing device 60 (e.g., PC). FIG. 17 schematically illustrates an overall view of application of the theft prevention/deterrent system and method.

Figure 18:
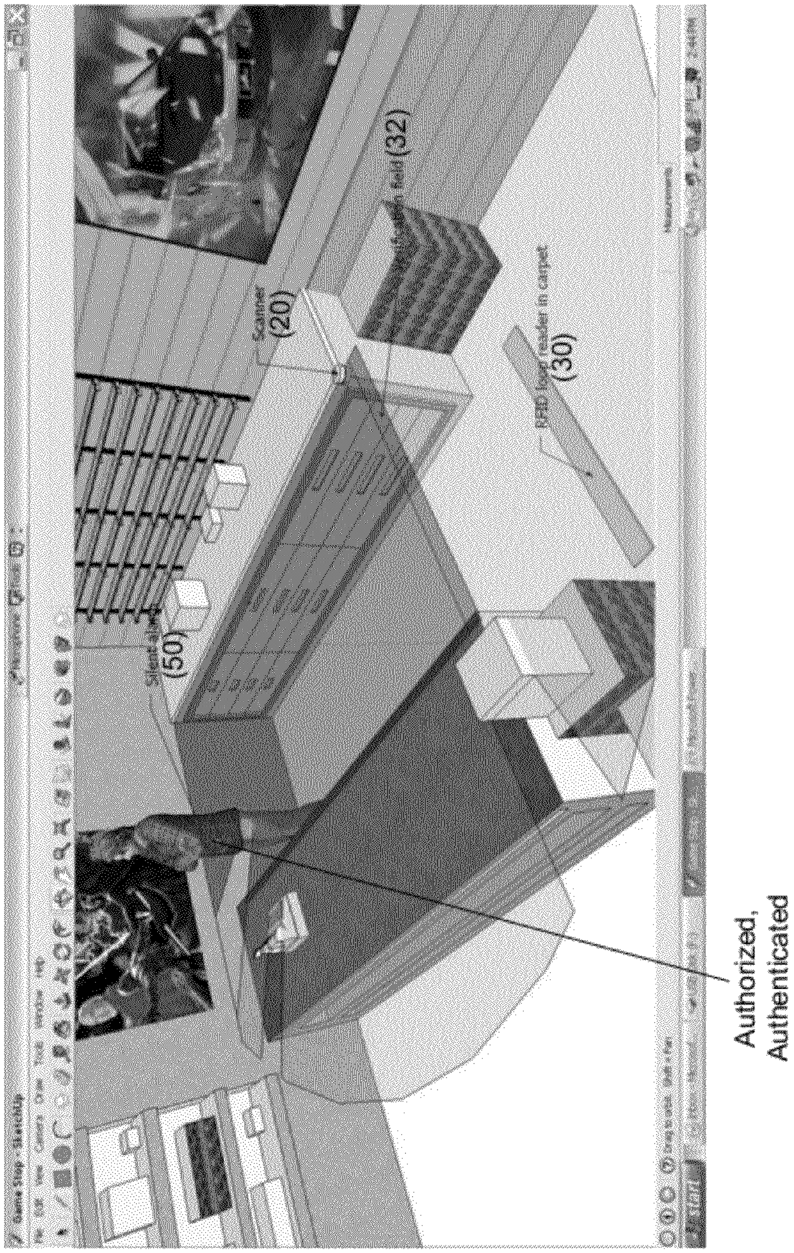
FIGS. 18 and 19 schematically illustrate an example embodiment of application of a theft prevention/deterrent system and method.
Figure 19:
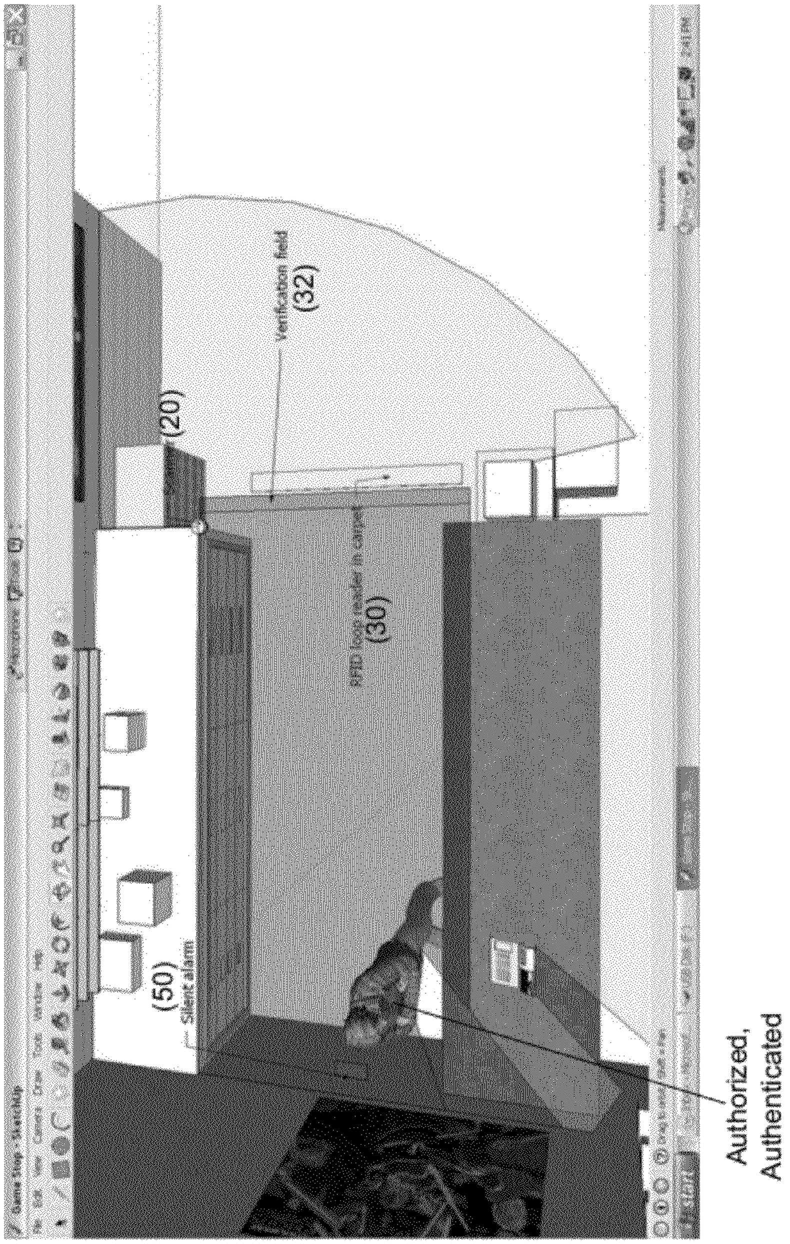

FIGS. 18 and 19 schematically illustrate an example embodiment of application of the theft prevention/deterrent system and method, with FIG. 18 providing a general layout of application of the theft prevention/deterrent system and method, and FIG. 19 providing an overhead view of the general layout.

In one embodiment, the RFID reader 30 will communicate to the laser scanner 20 how many individuals should be in the space. (In one embodiment, tagged employees have a specific name associated with their badge.) In this regard, if "Employee X" leaves the space by passing by the RFID reader 30 and passing through the verification field (i.e., RFID read zone 32), the RFID reader 30 will communicate to the laser scanner 20 to subtract "1". However, should "Employee X" leave the space without passing by the RFID reader 30 and without passing through the verification field (i.e., RFID read zone 32), the system will initiate an alarm. For example, should "Employee X" leave the space (e.g., drop to the floor) for longer than a predetermined time (e.g., a few seconds), the system will initiate an alarm since "Employee X" has not passed by the RFID reader 30 and has not passed through the verification field (i.e., RFID read zone 32).

By including the verification field (i.e., RFID read zone 32), the scanner 20 will look for an RFID reading within a defined amount of time before/after the RFID reader 30 is passed. For example, when a tagged employee leaves the space, they will walk through the verification field and trigger an RFID reading when walking past the RFID reader 30. Thus, the alarm will not sound because the reading is captured within the allotted time. When the tagged employee enters the space, the RFID reader 30 will receive a reading as the employee walks through the verification field (i.e., RFID read zone 32). No alarm will sound due to the RFID reader receiving the reading.

If the tagged employee leaves the beam of the laser scanner, but does not leave the space (e.g., lays down or "drops to the floor"), and an unauthorized individual walks into the space, without the verification field, the system would not alarm because according to the RFID reader there should be 1 individual behind the counter and there is (i.e., the unauthorized individual). However, with the verification field (more specifically, with the verification field now infringed), the system is looking for an RFID reading to identify if a new employee has entered or if the employee has left. Since the RFID does not see a reading, entry by the unauthorized individual will set off an alarm.

The disclosed system(s) and method(s) establish a theft prevention or theft deterrent system utilizing authorization/verification (e.g., RFID tag, RFID reader), boundary detection established with a configurable infrared (IR) horizontal light shield/apron and/or vertical light shield/curtain (e.g., laser sensor/scanner), and dry contact output signals allowing initiation of one or more actions after a security breach, including security system output (e.g., alarm, camera, central monitoring) to provide automated access control without physical barriers for asset protection and security assurance, including employee safety. The disclosed system(s) and method(s) allow only authorized personnel into protected areas and, in one embodiment, initiate an automated response to a security breach without requiring physical action by the employee.

As a theft prevention/deterrent solution, the disclosed system(s) and method(s) provide authorized employees entry into a scan field (e.g., continuously running horizontal IR curtain) of an armed alarm zone (i.e., secure zone). The employee is recognized as a valid individual, and is allowed to freely maneuver inside the armed alarm zone. If the employee is engaged with a customer, for example, on one side of the sales counter, the system will activate when an unauthorized person reaches into the secure zone, for example, out of the employee's view. If the employee leaves the counter or area, for example, to assist a customer, the initial area monitored by the employee is immediately protected.

In a robbery or theft situation, an employee may be forced to remain inactive while the perpetrator breaches the IR laser curtain. The secured laser zone instantly recognizes the unauthorized individual, and the dry contact output of the system can connect to a DI (digital input) terminal on an IP (Internet protocol) camera to prompt action. Depending on the camera, features such as initiating recording, recording in high resolution, providing a live feed, and even streaming the event with video footage to a smartphone, are accessible.

In providing asset protection, the disclosed system(s) and method(s) protect product, such as high-value goods, from theft by identifying a breach by unauthorized individuals before they attempt to remove the product. If an employee is occupied, for example, with a customer or other task, the disclosed system(s) and method(s) provide protection over the areas out of the employee's sight or unattended by the employee.

As a loss prevention solution, the disclosed system(s) and method(s) detect the presence of an authorized employee or other authorized personnel who is equipped, for example, with an active RFID tag that authorizes access into the restricted area. When an authorized employee leaves the restricted area, the system arms itself by creating a highly-configurable eye-safe infrared (IR) horizontal apron and/or vertical curtain. After the system is armed, it automatically recognizes authorized employees and allows authorized employees to move freely without being distracted or restricted by standard access control systems, like proximity card readers or turnstiles. Upon re-entry into the protected area by the authorized employee or other authorized personnel, the system deactivates or remains active.

The disclosed system(s) and method(s) generate an alarm (or other security action) whenever an unauthorized person or object enters a prohibited area or protected space. For example, if an unauthorized person or object breaches the protected space, the breach triggers, for example, a pre-theft alarm and/or notifies personnel in an effort to prevent full execution of the theft (i.e., a true loss prevention solution). The system initiates multiple security actions including: event-driven camera recording and communications, such as initiating and recording video in high definition or providing a live stream video to any device, trigger of an enunciator or audible alarm, and/or connection to an alarm panel or central monitoring.

In providing security assurance, the disclosed system(s) and method(s) cover not only assets, but also employees. An employee can be put at risk during a robbery or attempting to prevent theft. The system protects employees by automatically triggering monitoring systems as soon as suspicious activity is detected in a restricted zone. When connected to an alarm panel or central monitoring, the system may signal deployment of authorities. Once the central monitoring company receives the alarm signal, they can dispatch authorities without requiring physical action by the employee in crisis.

The disclosed system(s) and method(s) can be incorporated into an existing security system, or installed as a stand-alone theft prevention or theft deterrent solution, and can provide retailers with protection from external and internal theft (e.g., an employee unauthorized for entry to a restricted space may trigger a breach, and/or entry by an employee to a restricted space may trigger event-driven camera recording, thereby deterring possible internal theft by the employee). The disclosed system(s) and method(s) may be deployed in areas such as store rooms, sales counters, retail cash wrap counters, computer server rooms, in-store pharmacies, jewelry and product counters, warehouses and more.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A theft prevention system, comprising:

an RFID reader configured to read an RFID tag to authenticate access to a predefined area;

a laser scanner configured to scan the predefined area and detect an object in the predefined area; and a security component configured to initiate a security action when the detected object is at least one of an unauthenticated object and an unauthorized object, wherein the laser scanner is configured to be activated with an authorized individual being within the predefined area, and the security component is configured to initiate the security action when the authorized individual is no longer detected as being within the predefined area and the RFID reader has not detected exit from the predefined area by the authorized individual.

2. The system of claim 1, wherein the laser scanner has a scan zone, and the predefined area comprises a secure zone defined within the scan zone.

3. The system of claim 2, wherein the RFID reader has a read zone.

4. The system of claim 3, wherein the read zone is established at an access point to the secure zone.

5. The system of claim 1, wherein the RFID tag is associated with an individual having authorized access to the predefined area.

6. The system of claim 5, wherein the RFID tag is configured to be on the person of the individual having authorized access to the predefined area.

7. The system of claim 5, wherein the RFID reader is configured to monitor entry into and exit from the predefined area by the individual having authorized access to the predefined area.

8. The system of claim 1, wherein the laser scanner is configured to be inactivated in response to an authorized individual being within the predefined area.

9. The system of claim 1, wherein the laser scanner comprises a time-of-flight laser scanner.

10. A theft prevention system, comprising:

a laser scanner having a scan zone and a secure zone defined within the scan zone;

an RFID reader having a read zone;

an RFID tag associated with authorized access to the secure zone; and a security component associated with the laser scanner and the RFID reader, wherein the laser scanner scans the secure zone to detect an object in the secure zone, wherein the RFID reader reads the RFID tag to authenticate access to the secure zone, and wherein the security component initiates a security action when at least one of the object detected in the secure zone is unauthorized for access to the secure zone and the object detected in the secure zone is unauthenticated for access to the secure zone, wherein the object comprises an individual having authorized access to the secure zone, and the security component initiates the security action when the authorized individual is no longer detected as being within the secure zone and the RFID reader has not detected exit from the secure zone by the authorized individual.

11. The system of claim 10, wherein the read zone of the RFID reader is established at an access point to the secure zone of the laser scanner.

12. The system of claim 10, wherein the RFID tag is associated with an individual having authorized access to the secure zone.

13. The system of claim 12, wherein the RFID tag is to be on the person of the individual having authorized access to the secure zone.

14. The system of claim 12, wherein the RFID tag is read by the RFID reader to monitor entry into and exit from the secure zone by the individual.

15. The system of claim 10, wherein the object comprises an individual having unauthorized access to the secure zone.

16. The system of claim 10, wherein the object comprises an authorized object.

17. The system of claim 10, wherein the object comprises an unauthorized object.

18. A theft prevention method, comprising:

reading an RFID tag to authenticate access to a predefined area;

scanning the predefined area to detect an object in the predefined area; and initiating a security action when the object detected in the predefined area is at least one of an unauthenticated object and an unauthorized object, including initiating the security action when an authorized individual as the object detected in the predefined area is no longer detected within the predefined area and reading of the RFID tag to detect exit from the predefined area by the authorized individual has not occurred.

* * * * *